United States Patent
Gustafson et al.

(10) Patent No.: US 6,752,908 B2
(45) Date of Patent: Jun. 22, 2004

(54) SHOE PRESS BELT WITH SYSTEM FOR DETECTING OPERATIONAL PARAMETERS

(75) Inventors: Eric J. Gustafson, Stephens City, VA (US); William S. Butterfield, Stephens City, VA (US); Bertram Staudenmaier, Northboro, MA (US)

(73) Assignee: Stowe Woodward, LLC, Southborough, MA (US)

( * ) Notice: Subject to any disclaimer, the term of this patent is extended or adjusted under 35 U.S.C. 154(b) by 357 days.

(21) Appl. No.: 09/872,584

(22) Filed: Jun. 1, 2001

(65) Prior Publication Data

US 2002/0179270 A1 Dec. 5, 2002

(51) Int. Cl.⁷ .............................. D21F 3/00; D21F 7/00
(52) U.S. Cl. ................ 162/358.3; 162/263; 162/358.4; 162/901; 428/36.2; 428/222; 100/99
(58) Field of Search ................................ 162/198, 192, 162/252, 358.1, 262, 358.2, 263, 358.3, 358.4, 900–904, DIG. 10; 139/383 A, 383 AA, 425 A; 198/810.01, 810.02, 810.03, 810.04; 226/22, 23, 45; 428/36.1, 36.2, 222, 295.1, 297.4; 700/122–129; 442/60; 340/676; 100/110, 118, 121, 153, 155 R, 156, 173, 99

(56) References Cited

U.S. PATENT DOCUMENTS

| | | |
|---|---|---|
| 1,384,806 A | 7/1921 | Reed |
| 1,993,718 A | 3/1935 | Miner |
| 2,597,858 A | 5/1952 | Freedlander |
| 3,184,828 A | 5/1965 | Dames, Jr. |
| 3,410,942 A | 11/1968 | Bayer |
| 3,646,652 A | 3/1972 | Heiligenthal et al. |
| 3,800,381 A | 4/1974 | Brafford |
| 3,877,919 A | 4/1975 | Shorr |
| 3,962,911 A | 6/1976 | Grenlund |

(List continued on next page.)

FOREIGN PATENT DOCUMENTS

| | | | |
|---|---|---|---|
| AU | 2000 22299 | * | 9/1998 |
| DE | 4007 141 C | | 3/1990 |

(List continued on next page.)

OTHER PUBLICATIONS

Paasonen: *The Roll of Composite Roll Covers in Soft and Super Calendering*: 46th Congress Annual ATIP, Grenoble, 20–22 (Oct. 1993) pp 1–13.

(List continued on next page.)

Primary Examiner—Steven P. Griffin
Assistant Examiner—Eric Hug
(74) Attorney, Agent, or Firm—Myers Bigel Sibley & Sajovec

(57) ABSTRACT

A shoe press includes: a first member; a second member; a substantially cylindrical belt; and a processing unit. The first member has a convex pressing surface. The second member includes a shoe with a concave pressing surface substantially complimentary to the convex pressing surface. The second member further includes a pair of substantially circular head plates rotatably mounted on axially opposed ends thereof. The belt is fixed to, extends between, and is rotatable with the head plates such that a portion of the belt passes between the convex pressing surface and the concave pressing surface. The belt includes embedded therein a communications cable having a plurality of sensors configured to generate signals responsive to an operating parameter of the shoe press. The processing unit is in communication with the communications cable and processes signals generated by the sensors. Thus, signals generated by the sensors and processed by the processing unit represent conditions (particularly pressure, nip width, temperature, strain and stress) within the nip of the shoe press that can be displayed and understood by an operator.

45 Claims, 5 Drawing Sheets

U.S. PATENT DOCUMENTS

| | | | |
|---|---|---|---|
| 4,016,756 A | * | 4/1977 | Kunkle .................. 73/862.041 |
| 4,064,313 A | | 12/1977 | Takiguchi et al. |
| 4,087,320 A | * | 5/1978 | Danahy et al. ............. 162/252 |
| 4,127,629 A | | 11/1978 | Weaver et al. |
| 4,178,664 A | | 12/1979 | McLoughlin |
| 4,224,372 A | | 9/1980 | Romanski |
| 4,229,253 A | | 10/1980 | Cronin |
| 4,229,254 A | | 10/1980 | Gill |
| 4,233,011 A | | 11/1980 | Bolender et al. |
| 4,238,287 A | | 12/1980 | Gill |
| 4,258,089 A | | 3/1981 | Anderson et al. |
| 4,288,058 A | | 9/1981 | Inman |
| 4,309,803 A | | 1/1982 | Blaszak |
| 4,368,568 A | | 1/1983 | Watanabe |
| 4,439,391 A | | 3/1984 | Hung |
| 4,446,187 A | | 5/1984 | Eklund |
| 4,464,921 A | | 8/1984 | Surat |
| 4,509,237 A | | 4/1985 | Volz et al. |
| 4,551,894 A | | 11/1985 | Beucker |
| 4,552,620 A | | 11/1985 | Adams |
| 4,555,305 A | * | 11/1985 | Steiner et al. ............. 162/205 |
| 4,559,258 A | | 12/1985 | Kiuchi |
| 4,576,845 A | | 3/1986 | Krotchko |
| 4,643,916 A | | 2/1987 | Kiuchi |
| 4,646,912 A | * | 3/1987 | Houck et al. .......... 198/810.02 |
| 4,673,461 A | | 6/1987 | Roerig et al. |
| 4,674,622 A | | 6/1987 | Utsunomiya et al. |
| 4,701,368 A | | 10/1987 | Kiuchi et al. |
| 4,705,711 A | | 11/1987 | Perna |
| 4,729,153 A | | 3/1988 | Pav et al. |
| 4,760,232 A | | 7/1988 | Smith |
| 4,787,946 A | | 11/1988 | Romanski |
| 4,812,185 A | | 3/1989 | Romanski |
| 4,829,931 A | | 5/1989 | Mogi |
| 4,842,944 A | | 6/1989 | Kuge et al. |
| RE33,034 E | | 8/1989 | Schiel et al. |
| 4,859,396 A | | 8/1989 | Krenkel |
| 4,861,434 A | | 8/1989 | Bonander et al. |
| 4,877,472 A | | 10/1989 | Rodal |
| 4,878,281 A | | 11/1989 | Flamig et al. |
| 4,880,501 A | | 11/1989 | Schiel |
| 4,887,340 A | | 12/1989 | Kato et al. |
| 4,889,674 A | | 12/1989 | Krenkel et al. |
| 4,898,012 A | | 2/1990 | Jones et al. |
| 4,903,597 A | | 2/1990 | Hoage et al. |
| 4,908,103 A | | 3/1990 | Cronin et al. |
| 4,910,985 A | | 3/1990 | Ballyns |
| 4,944,089 A | | 7/1990 | Flamig et al. |
| 4,944,844 A | | 7/1990 | Marcinko |
| 4,946,731 A | | 8/1990 | Dutt |
| 4,973,383 A | | 11/1990 | Filzen |
| 4,975,152 A | | 12/1990 | Filzen |
| 4,978,428 A | | 12/1990 | Cronin et al. |
| 4,981,721 A | | 1/1991 | Krenkel et al. |
| 4,984,467 A | | 1/1991 | Haefner |
| 4,998,333 A | | 3/1991 | Skytta |
| 5,014,406 A | | 5/1991 | Kato et al. |
| 5,023,985 A | | 6/1991 | Salo et al. |
| 5,048,353 A | | 9/1991 | Justus |
| 5,062,924 A | | 11/1991 | McCarten et al. |
| 5,066,344 A | | 11/1991 | Inami et al. |
| 5,091,027 A | | 2/1992 | Watanabe |
| 5,107,625 A | | 4/1992 | Steiner et al. |
| 5,118,391 A | | 6/1992 | Matuschczyk et al. |
| 5,132,141 A | | 7/1992 | Schon |
| 5,134,010 A | | 7/1992 | Schiel |
| 5,138,766 A | | 8/1992 | Kimura et al. |
| 5,167,068 A | | 12/1992 | Leino et al. |
| 5,167,771 A | | 12/1992 | Sayers et al. |
| 5,171,389 A | | 12/1992 | Stigberg |
| 5,196,092 A | | 3/1993 | Stigberg |
| 5,208,087 A | | 5/1993 | Stigberg |
| 5,217,532 A | | 6/1993 | Sasame et al. |
| 5,234,551 A | | 8/1993 | Dutt et al. |
| 5,235,747 A | | 8/1993 | Leino et al. |
| 5,238,537 A | | 8/1993 | Dutt |
| 5,253,027 A | | 10/1993 | Goto |
| 5,277,728 A | | 1/1994 | Stigberg |
| 5,290,164 A | | 3/1994 | Schiel |
| 5,294,909 A | | 3/1994 | Frazier |
| 5,298,124 A | | 3/1994 | Eklund et al. |
| 5,302,251 A | | 4/1994 | Schiel et al. |
| 5,320,702 A | | 6/1994 | Matuschczyk et al. |
| 5,342,486 A | | 8/1994 | Jeffery et al. |
| 5,376,448 A | | 12/1994 | Suzuki et al. |
| 5,379,652 A | | 1/1995 | Allonen |
| 5,383,371 A | * | 1/1995 | Laitinen .................. 73/862.55 |
| 5,403,995 A | | 4/1995 | Kishino et al. |
| 5,412,870 A | | 5/1995 | Lehtonen |
| 5,415,612 A | | 5/1995 | Carlson et al. |
| 5,427,728 A | | 6/1995 | Beck et al. |
| 5,435,054 A | | 7/1995 | Tonder et al. |
| 5,501,133 A | | 3/1996 | Brookstein et al. |
| 5,505,492 A | | 4/1996 | Nelson et al. |
| 5,520,600 A | | 5/1996 | Fukumoto |
| 5,525,194 A | | 6/1996 | Jermo |
| 5,543,015 A | | 8/1996 | Jermo |
| 5,553,381 A | | 9/1996 | Lehtonen |
| 5,555,932 A | | 9/1996 | Dudley |
| 5,592,875 A | * | 1/1997 | Moschel ...................... 100/99 |
| 5,601,877 A | | 2/1997 | Miller et al. |
| 5,601,920 A | | 2/1997 | Paasonen et al. |
| 5,609,811 A | | 3/1997 | Jermo |
| 5,699,729 A | | 12/1997 | Moschel |
| 5,709,765 A | | 1/1998 | Herbert et al. |
| 5,742,880 A | | 4/1998 | Takenaka et al. |
| 5,753,085 A | | 5/1998 | FitzPatrick |
| 5,761,801 A | | 6/1998 | Gebhardt et al. |
| 5,772,848 A | | 6/1998 | Dutt |
| 5,780,131 A | | 7/1998 | Paasonen et al. |
| 5,789,052 A | | 8/1998 | Miller et al. |
| 5,833,898 A | | 11/1998 | Dutt |
| 5,857,950 A | | 1/1999 | Hycner |
| 5,953,230 A | * | 9/1999 | Moore ........................ 700/122 |
| 5,965,208 A | | 10/1999 | Fagerholm et al. |
| 6,158,576 A | * | 12/2000 | Eagles et al. .......... 198/810.01 |
| 6,264,577 B1 | * | 7/2001 | Hutchins .................... 474/106 |
| 6,306,261 B1 | * | 10/2001 | Meschenmoser et al. 162/358.5 |
| 6,341,522 B1 | * | 1/2002 | Goss et al. ................... 73/159 |
| 6,441,904 B1 | * | 8/2002 | Shakespeare ............... 356/429 |
| 6,461,701 B1 | * | 10/2002 | Schlueter et al. .......... 428/36.1 |
| 6,524,229 B2 | * | 2/2003 | Pramila et al. ................ 492/10 |

FOREIGN PATENT DOCUMENTS

| | | |
|---|---|---|
| EP | 0 194 602 A1 | 9/1986 |
| EP | 0 328 844 A1 | 8/1989 |
| EP | 0 194 602 B1 | 7/1990 |
| EP | 0 420 372 A1 | 4/1991 |
| EP | 0 328 844 B1 | 1/1992 |
| EP | 0 534 041 A1 | 3/1993 |
| EP | 0 538 211 B1 | 4/1993 |
| EP | 0 538 211 A1 | 4/1993 |
| EP | 0 576 115 A1 | 12/1993 |
| EP | 0 420 372 B1 | 4/1994 |
| EP | 0 534 041 B1 | 2/1996 |
| EP | 0 695 827 A2 | 2/1996 |
| EP | 0 541 498 B1 | 4/1996 |
| EP | 0 576 115 B1 | 4/1996 |
| EP | 0 761 873 A1 | 3/1997 |
| EP | 0 695 827 A3 | 5/1997 |
| EP | 0 815 948 A1 | 1/1998 |

| | | |
|---|---|---|
| EP | 0838549 | 4/1998 |
| EP | 0 877 119 A2 | 11/1998 |
| EP | 0 877 119 A3 | 2/1999 |
| EP | 0 922 806 A3 | 4/1999 |
| EP | 0922806 | 6/1999 |
| EP | 0 922 806 A2 | 6/1999 |
| EP | 0 969 143 A2 | 1/2000 |
| EP | 0 761 873 B1 | 4/2000 |
| JP | J6 1258-794 A | 5/1985 |
| JP | 61-171913 | 8/1986 |
| JP | 2259-186 A | 3/1989 |
| JP | 5-106189 | 4/1993 |
| JP | 6-58324 | 3/1994 |
| JP | 11 350370 | 12/1999 |
| WO | WO 92/02677 | 2/1992 |
| WO | WO 94/09208 | 4/1994 |
| WO | WO 95/17298 | 6/1995 |
| WO | WO 95/25200 | 9/1995 |
| WO | WO 95/29293 | 11/1995 |
| WO | WO 96/12065 | 4/1996 |
| WO | WO 96/25288 | 8/1996 |
| WO | WO 96/31342 | 10/1996 |
| WO | WO 97/38162 | 10/1997 |
| WO | WO 98/15402 | 4/1998 |
| WO | WO 98/24968 | 6/1998 |
| WO | WO 99/14426 | 3/1999 |
| WO | WO 99/54546 | 10/1999 |

OTHER PUBLICATIONS

Watanabe: *Method for Producing A Hardened Roller; Japan Patent Office, Patent Announcement Hei3–47359, Application SHO 62–335378*, Date of Application: Dec. 30, 1987, Disclosure Announcement HEI 1–260092 Oct. 17, 1989.

International Search Report ofr PCT/US02/06520; Oct. 1, 2002.

* cited by examiner

SHOE PRESS BELT WITH SYSTEM FOR DETECTING OPERATIONAL PARAMETERS

FIELD OF THE INVENTION

The present invention relates generally to nip presses, and more particularly to shoe presses.

BACKGROUND OF THE INVENTION

In the conventional fourdrinier papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more presses (often roller presses) covered with another fabric, typically referred to as a "press felt." Pressure from the presses removes additional moisture from the web; the moisture removal is often enhanced by the presence of a "batt" layer of the press felt. The paper is then transferred to a dryer section for further moisture removal. After drying, the paper is ready for secondary processing and packaging.

Over the last 25 or 30 years, a "shoe press" has been developed for the press section of the papermaking machine. A shoe press includes a roll or similar structure that mates with a "shoe" of an opposed roll or press structure; the surface of the shoe is somewhat concave and approximates in curvature the convex profile of the mating roll. This arrangement can increase the width of the nip in the direction of paper travel, thereby enabling greater amounts of water to be removed therein.

Endless belts or blankets have traditionally been used in shoe press operations. The belt overlies and contacts the shoe of the press; in turn, the press felt overlies the shoe press belt, and the paper web overlies the press felt The shoe press belt and press felt travel through the nip and, in doing so, convey the paper web through the nip. The press felt travels over a set of rollers arranged around the shoe. In older embodiments, shoe press belts were also driven by sets of drive rollers arranged around the shoe. In some newer configurations, however, the shoe press belt is clamped or otherwise fixed to the edges of circular head plates located on either end of the shoe, such that rotation of the head plates causes the shoe press belt to rotate and travel through the nip.

Given the performance requirements, a shoe press belt should be sufficiently flexible to pass around the drive rollers or head plates and through the shoe and sufficiently durable to withstand the repeated application of pressure within the nip. Because of these performance parameters, most endless belts are formed entirely or predominantly of a polymeric material (often polyurethane). Many shoe press belts also include reinforcing fibers or a reinforcing fabric between or embedded in polymeric layers. Also, shoe press belts may be configured to encourage water to pass from the paper web. To this end, some shoe press belts have grooves or blind-drilled holes in the surface adjacent the press felt that serve to vent water from the paper that is exiting the press felt.

As the paper web is conveyed through the nip, it can be very important to understand the pressure profile experienced by the paper web. Variations in nip pressure can impact the amount of water drained from the web, which can affect the ultimate sheet moisture content, thickness, and other properties. Excessive nip pressures can cause crushing or tearing of the web. Of course, in a shoe press the pressure typically varies at different locations in the nip, both along and transverse to the direction of paper travel, and can also vary over time. As a result, it would be desirable to have a reliable technique and apparatus for determining the pressure distribution and area of the nip in a shoe press.

Other properties of a shoe press belt can also be important. For example, the stress and strain experienced by the belt, both in the machine direction and the cross machine direction, can provide information about the durability and dimensional stability of the belt. In addition, the temperature profile of the belt can assist in identifying potential problem areas of the belt. As such, it would be desirable to have a reliable technique and apparatus for determining these properties of a shoe press belt.

SUMMARY OF THE INVENTION

The present invention is directed to a shoe press and associated belt that can determine operating parameters within the nip of a shoe press. A shoe press of the present invention comprises: a first member; a second member; a substantially cylindrical belt; and a processing unit. The first member has a convex pressing surface. The second member includes a shoe with a concave pressing surface substantially complimentary to the convex pressing surface. The second member further includes a pair of substantially circular head plates rotatably mounted on axially opposed ends thereof. The belt is fixed to, extends between, and is rotatable with the head plates such that a portion of the belt passes between the convex pressing surface and the concave pressing surface. The belt includes embedded therein a communications cable having a plurality of sensors configured to generate signals responsive to an operating parameter of the shoe press. The processing unit is in communication with the communications cable and processes signals generated by the sensors. Thus, signals generated by the sensors and processed by the processing unit represent conditions (particularly pressure, nip width, temperature, strain and stress) within the nip of the shoe press that can be displayed and understood by an operator.

In one embodiment, the belt comprises: a substantially cylindrical inner polymeric layer having a first longitudinal axis and a radially inner surface; a substantially cylindrical outer polymeric layer having a second longitudinal axis that is substantially collinear with the first axis and a radially outer surface; a substantially cylindrical fabric layer sandwiched between the inner and outer polymeric layers; and a communications cable having a plurality of sensors configured to detect an operating parameter of a shoe press. The radially inner and radially outer surfaces define a belt thickness, and the sensing fiber extends within the belt thickness. Preferably, the inner and outer polymeric layers are polyurethane, and the sensing fiber is an optical fiber that travels in a single helix along the length and circumference of the belt.

DETAILED DESCRIPTION OF THE INVENTION

Figure 1:
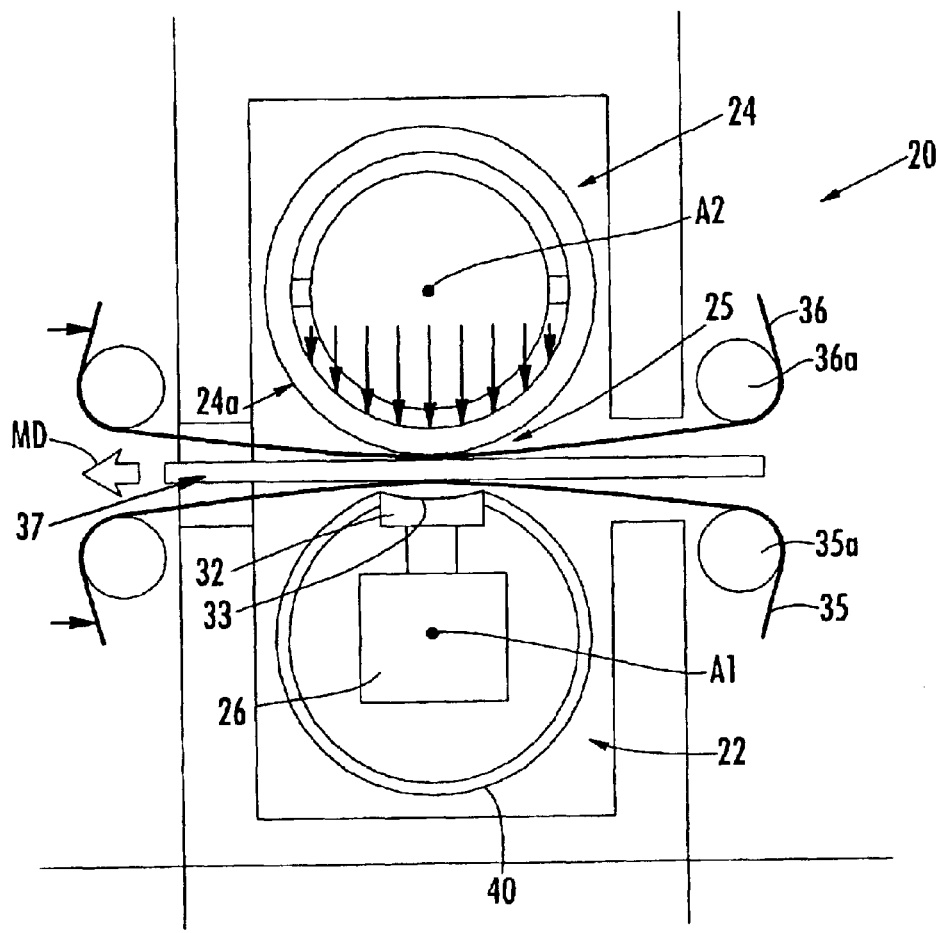
FIG. 1 is an end view of a shoe press of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Figure 2:
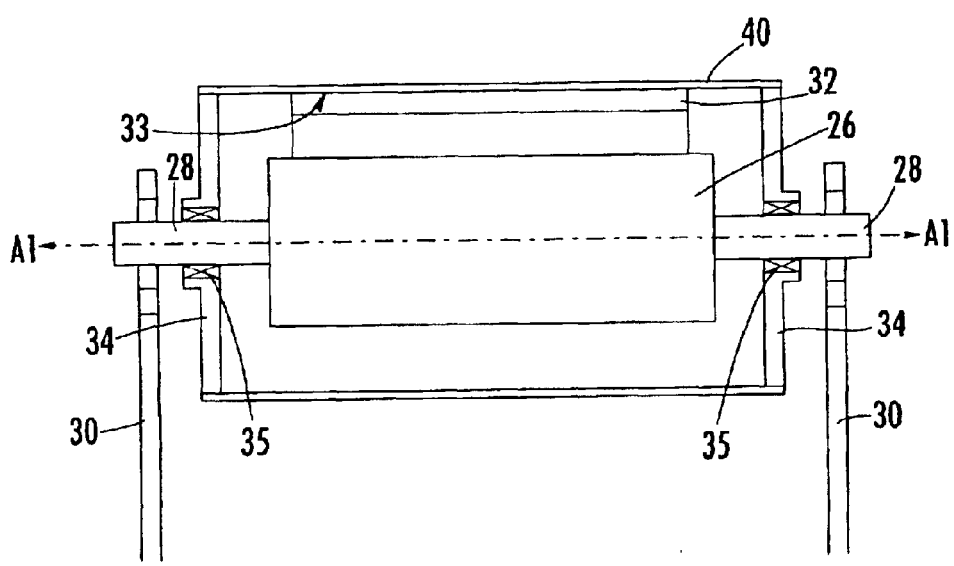
FIG. 2 is a front section view of the lower roll and shoe press belt of the shoe press of FIG. 1.

Referring now to FIGS. 1 and 2, a shoe press, designated broadly at 20, is illustrated therein. The shoe press 20 includes a lower roll 22 and a mating upper roll 24 that define therebetween a nip 25 through which a web or sheet, such as a paper web 37, can travel. Each of the lower and upper rolls 22, 24 defines a respective axis A1, A2; the axes A1, A2 are essentially parallel with one another and substantially perpendicular to the direction MD that the web 37 travels. As can be seen in FIG. 1, illustratively and preferably press felts 35, 36 are positioned between the lower and upper rolls 22, 24; the press felts 35,36 are driven around respective sets of drive rollers 35a, 36a by the lower and upper rolls 22, 24. The web 37 is conveyed by and between the press felts 35, 36.

Referring again to FIGS. 1 and 2, the lower roll 22 includes a beam 26 that extends parallel to the axis A1. At either end, the beam 26 includes a round shaft 28 that engages and is supported by a bracket 30. A shoe 32 with a concave pressing surface 33 extends upwardly from the beam 26. The shoe 32 is mounted onto the beam 26 such that it can be controllably biased upwardly; the biasing of the shoe 32 can be accomplished with, for example, a hydraulic system (not shown). A circular head plate 34 is rotatably mounted on each shaft 28 spaced apart from the end of the shoe 26. Bearings 35 enable the head plates 34 to be rotated on the shaft 28.

A substantially cylindrical shoe press belt 40 is mounted about the perimeter of each head plate 34 such that its longitudinal axis is substantially parallel with the axis A1. The shoe press belt 40 is fixed to the head plates 34 (by clamping or the like) such that, as the head plates 34 rotate about the shafts 28, they cause the shoe press belt 40 to rotate also. Typically, the shoe press belt 40 is between about 40 and 84 inches in diameter and between about 120 and 480 inches in length.

As shown in FIG. 1, the lower and upper rolls 22, 24 are positioned relative to each other so that the upper roll 24 causes the shoe press belt 40 to deflect from a cylindrical configuration and conform to the configuration of the pressing surface 33 of the shoe 32. The pressing surface 33 of the shoe 32 is shaped to be substantially complimentary to the convex profile of the upper roll 24, with the result that the nip 25 has significant width and is extended in the direction MD (see FIG. 2, wherein the width of the nip 25 is designated α; this dimension is typically between about 8 and 12 inches). Both the shoe 32 and the upper roll 24 can be adjusted to control the magnitude and distribution of the pressure in the nip 25; in particular, the shoe 32 may be pivotable about an axis parallel to axis A1 that enables the pressure to be adjusted along the direction of web travel MD. As the shoe press belt 40 rotates with the head plates 34, portions thereof are deflected by the contact surface 24a of the upper roll 24 to contact the contact surface 33 of the shoe 32.

Those skilled in this art will recognize that the present invention may be suitable for shoe presses of other configurations. For example, the lower roll 22 may include a fixed shaft and a hydraulic shoe (such as that available from Voith Sulzer Papiernachschinen GmbH, Heidenheim, Germany under the tradename FLEXONIP), or may be replaced with a shoe alone, wherein the shoe press belt is guided across the shoe by a set of drive rollers. The upper roll 24 may be hydraulically supported (as is the case with the FLEXONIP press mentioned above), may include an adjustable convex shoe (such as that available from Voith Sulzer, Heidenheim, Germany, under the tradename INTENSA), or may lack adjustability. Also, the lower and upper members may be oriented such that the concave pressing surface of the shoe is presented by the upper member of the shoe press and the convex pressing surface is presented by the lower member of the shoe press. These and other configurations of suitable shoe presses are described and illustrated in Joint Textbook Committee of the Paper Industry, *Pulp and Paper Manufacture*, Vol. 7, 267–70 (Third Edition, 1991). Alternative configurations should include a shoe with a concave pressure surface that is adjustable and a mating structure (such as a roll or opposed convex shoe) that form a nip through which a shoe press belt travels.

Figure 3:
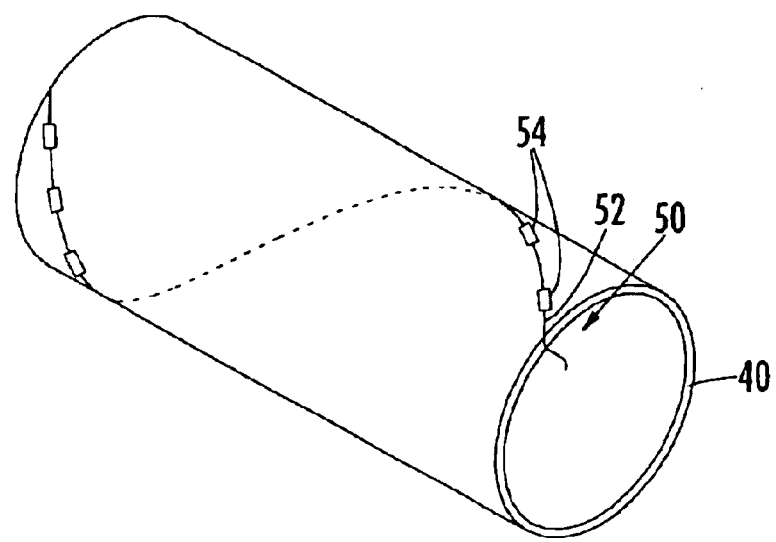
FIG. 3 is a perspective view of the shoe press belt of FIG. 1 with the outer polymeric layer removed to reveal the sensing fiber.
Figure 4:
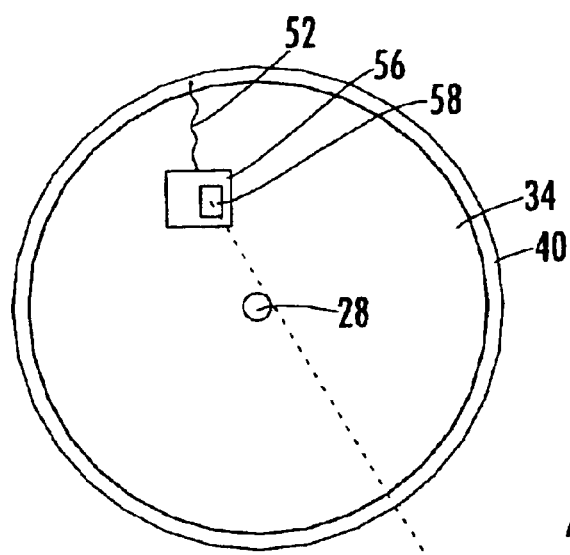
FIG. 4 is an enlarged end view of the roll and shoe press belt of FIG. 1 with a data collection system connected thereto illustrated schematically.
Figure 4:
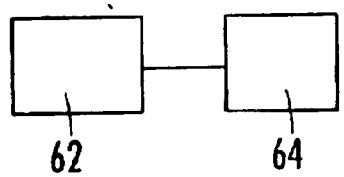

Referring now to FIGS. 3 and 4, the shoe press 20 includes a sensor assembly 50 that can detect operational parameters in the nip 25. The sensor assembly 50 includes a fiber 52 disposed within the shoe press belt 40. The fiber 52 has a series of sensors 54 along its length configured to respond to one or more operating parameters of interest in the nip 25, such as the magnitude and distribution of pressure, temperature, strain, stress, and nip width, and generate signals proportionate to such pressure. Those skilled in this art will recognize that the fiber 52 can be any type of communications cable in which information generated by the sensors 54 can pass.

Exemplary sensors 54 include fiber optic sensors, piezoelectric sensors, piezoresistive sensors, strain gage sensors, and the like, with fiber optic sensors being preferred.

Clearly, suitable sensors should be sufficiently durable to withstand the operating pressures and other environmental conditions experienced during operation of the shoe press belt 40 and sufficiently sensitive to respond accurately based on those operating conditions. Also, the fiber 52 or other communications cable should be selected to be compatible with the selected sensor type; for example, if fiber optic sensors are to be used, the fiber 52 should be an optical fiber. Preferred fiber optic sensors include microbend-type sensors, with particularly preferred sensors being described in U.S. patent application Ser. No. 09/489,768, the disclosure of which is hereby incorporated herein in its entirety. Such sensors are typically installed every 5 to 17 inches of circumference of the belt, so an exemplary shoe press belt 40 having a circumference of 190 inches may have between about 10 and 40 sensors 54. Illustratively and preferably, the sensors 54 are positioned substantially equidistant from each other along the length of the fiber 52, but other configurations, such as those in which sensors are more concentrated in one or more areas of particular interest, may also be used.

The fiber 52 is operatively connected to a processing unit 56 mounted on the outer surface of one of the head plates 34. The processing unit 56 receives signals generated by the sensors 54 as they pass through the nip 25. The processing unit 56 includes a signal transmitter 58 that is in communication with a signal receiver 62 mounted remotely from the shoe press 20. The signal receiver 62 is hard-wired to a personal computer 64 or other data processing device (such as the distributive control system of a paper mill) that can process signals from the transmitter 58 into useful, easily understood information. It is preferred that a wireless communication mode, such as RF signaling, be used to transmit the data from the processing unit 56 to the receiver 62. Suitable exemplary processing units are discussed in U.S. Pat. No. 5,562,027 to Moore, the disclosure of which is hereby incorporated herein in its entirety; other exemplary processing units include slip ring type electrical contacts.

As illustrated in FIG. 4, the fiber 52 may be disposed in the shoe press belt 40 in a helical configuration as it extends along the axis A1. The single helix (i.e., the fiber travels essentially one circumference of the belt 40 as it travels the length of the belt 40) of the fiber 52 places each sensor 54 at a position that is not aligned either axially or circumferentially with any other sensor 54. Such positioning can ensure that only one sensor 54 is located within the nip 25 at any one time, so transmission and receipt of data can be simplified (i.e., no multiplexer is required for data collection and processing).

Figure 5:
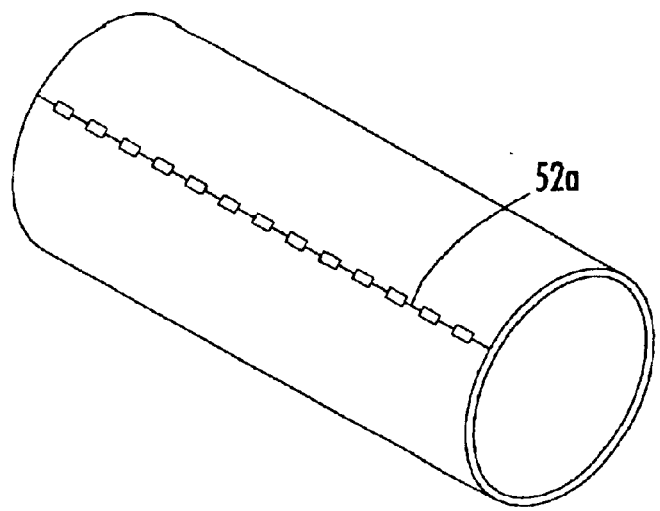
FIG. 5 is an alternative embodiment of a shoe press belt of the present invention with the outer polymeric layer removed to reveal the sensing fiber.
Figure 6:
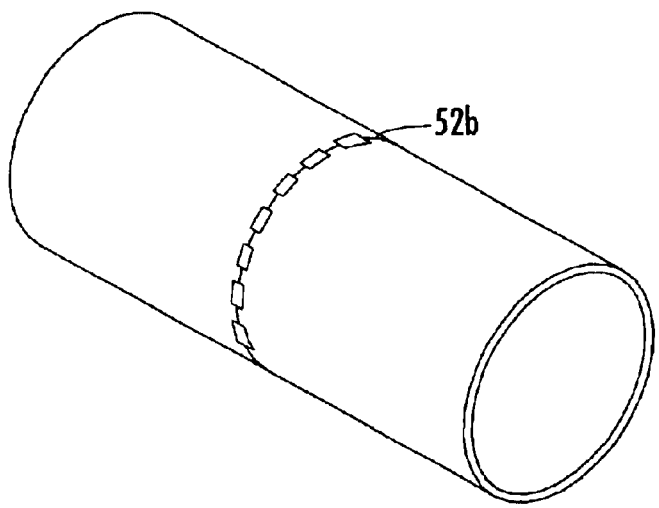
FIG. 6 is another embodiment of a shoe press belt of the present invention with the outer polymeric layer removed to reveal the sensing fiber.
Figure 7:
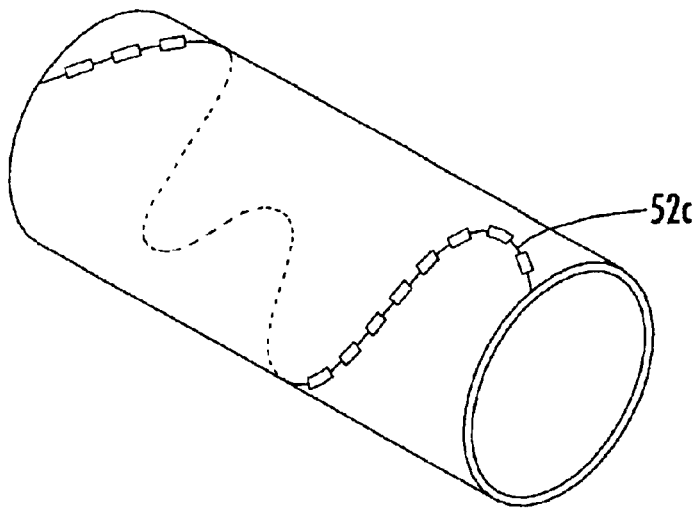
FIG. 7 is yet another embodiment of a shoe press belt of the present invention with the outer polymeric layer removed to reveal the sensing fiber.
Figure 10:
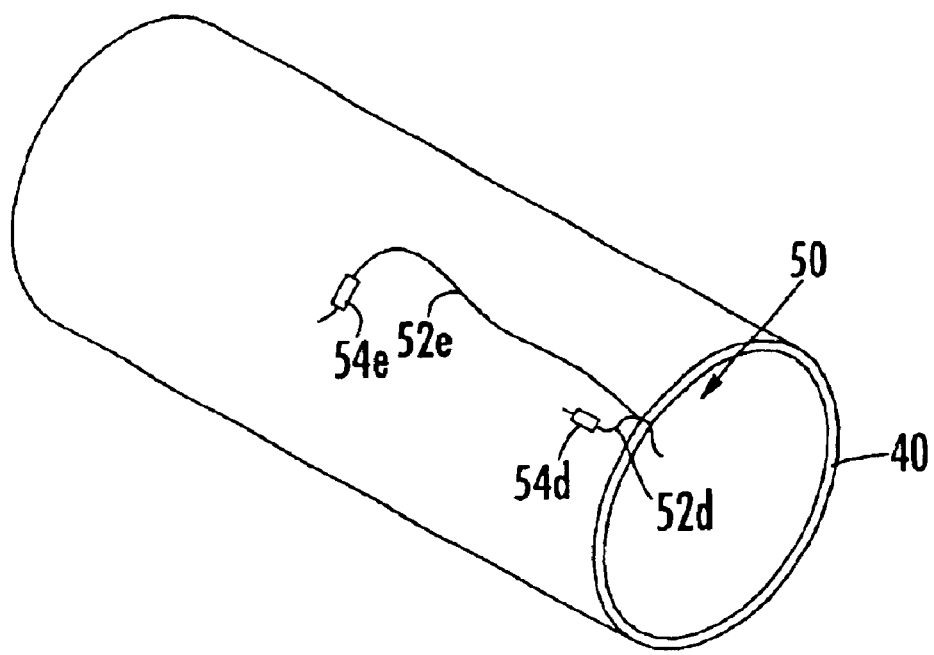
FIG. 10 is an alternative embodiment of a shoe press belt of the present invention configured for sensing machine direction and cross machine direction strain or stress.

Alternative configurations for the fiber 52 include those in which the fiber extends axially only (see fiber 52a in FIG. 5), the fiber extends only circumferentially (see fiber 52b in FIG. 6), and the fiber extends over a somewhat random pattern (see fiber 52c in FIG. 7). It should also be understood that, although the sensors 54 on the fibers 52a, 52b, 52c are essentially equally spaced along the length of the nip and the circumference of the shoe press belt 40, sensors that are unevenly spaced axially and/or circumferentially may also be employed. Those skilled in this art will appreciate that other configurations of the fiber may also be suitable for use with the present invention. Further, those skilled in this art will also appreciate that multiple fibers or communications cables containing sensors may also be employed (see FIG. 10). Moreover, a fiber or communications cable containing only a single sensor (such as fibers 52d, 522e shown in FIG. 10) may also be employed with the present invention; single sensor fibers like 52d, 52e may be particularly suitable for detection of axial strain in the belt (in the case of fiber 52d and sensor 54d) or circumferential strain (in the case of fiber 52e and sensor 54e). Alternatively, these sensors may be multiplexed on a single fiber or cable, or multiple sensors of a common type (for example, circumferential strain sensors) may be connected with one cable and sensors of another type (for example, axial strain sensors) may be connected with a second cable.

Figure 8:
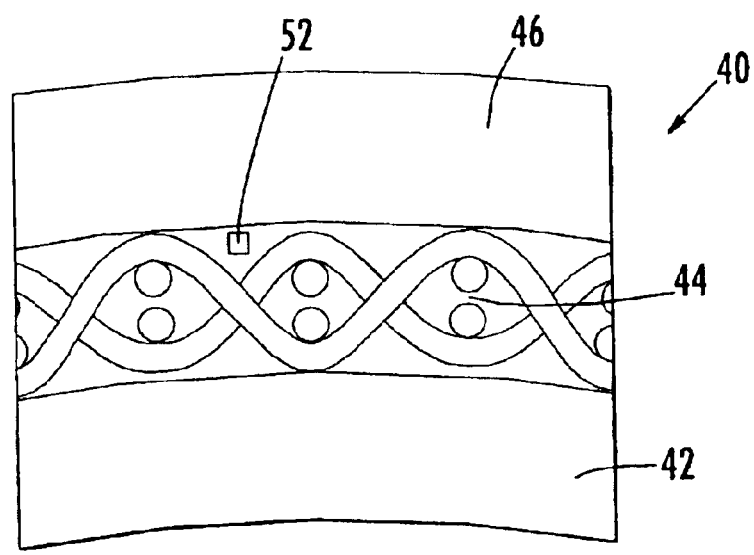
FIG. 8 is a greatly enlarged end section view of the shoe press belt of FIG. 1.
Figure 9:
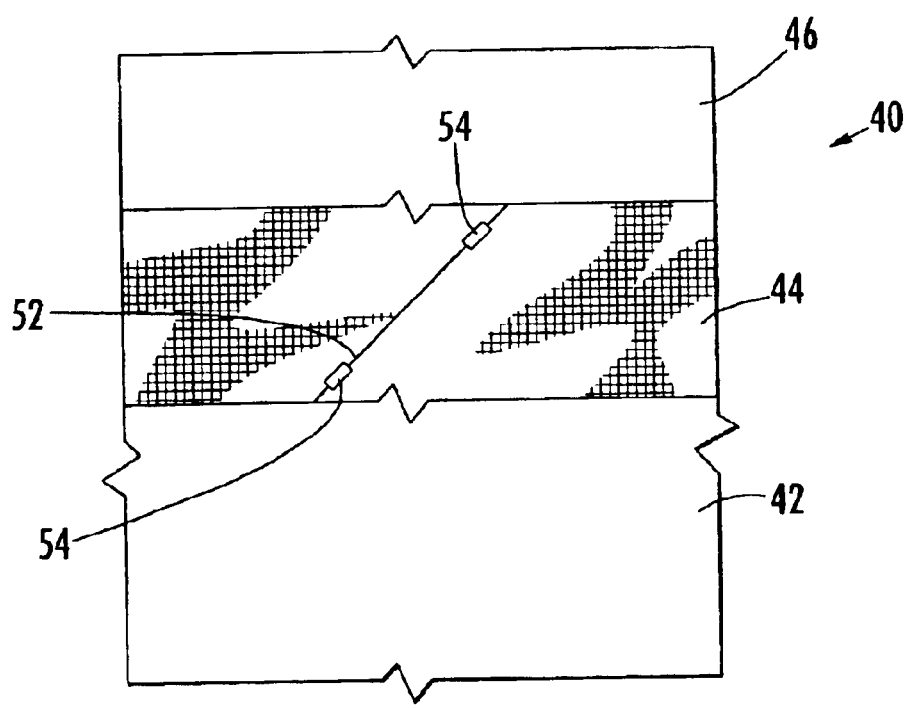
FIG. 9 is a greatly enlarged top section view of the shoe press belt of FIG. 1 with portions of the outer polymeric layer and fabric layer removed.

Referring now to FIGS. 8 and 9, illustratively and preferably the shoe press belt 40 includes an inner layer 42 (typically formed of a polymer such as polyurethane), a fabric layer 44, and an outer layer 46 (like the inner layer 42, the outer layer 46 is typically formed of a polymer such as polyurethane). Typically, the material comprising the inner and outer layers 42, 46 will be the same, but it need not be. An exemplary material for use in the inner and outer layers 42, 46 is a polyurethane material having a Pusey & Jones hardness value of between about 5 and 15. The inner layer 42 preferably has a thickness dimension of between about 0.025 and 0.100 inches, and the outer layer 46 preferably has a thickness dimension of between about 0.025 and 0.250 inches. It may also be desirable for the outer layer 46 to include grooves, blind-drilled holes, or other recesses to vent water from the paper web and press felt during operation; exemplary structures are illustrated in U.S. Pat. No. 4,559,258 to Kiuchi and U.S. Pat. No. 6,030,503 to Matuschcyzk, the disclosures of which are hereby incorporated herein by reference in their entireties.

The fabric layer 44 is included in the shoe press belt 40 to provide reinforcement in the machine and cross-machine directions. As used herein, the fabric layer 44 is intended to encompass both woven fabrics (such as those illustrated in U.S. Pat. No. 5,196,092 to Stigberg) and reinforcing structures having circumferentially-extending members (which may or may not be accompanied by axially-extending members), such as the constructions described and illustrated in U.S. Pat. No. 5,525,194 to Jermo, the disclosures of which are hereby incorporated herein in their entireties.

In the illustrated configuration, the fiber 52 overlies the fabric layer 44 (typically such that the fiber 52 is somewhat embedded in the outer layer 46). In some embodiments the fiber 52 may be interwoven with the fabric layer 44. For example, the fiber 52 may pass above and below yarns in the fabric layer 44 in a repeating pattern such that the sensors 54 are presented to the nip at the same depth below the outer surface of the outer layer 46. In certain embodiments the fiber 52 may even replace or accompany one or more yarns within the weave pattern of the fabric layer 44; this is particularly true for belts in which the fiber extends only axially or only circumferentially.

The shoe press belt 40 can be constructed by any manner known for the construction of shoe press belts, such as casting, molding, extrusion, or the like. In one embodiment, the shoe press belt 40 may be cast over a mandrel, which may include a removable or erodable material such as that described in U.S. Pat. No. 6,070,107 to Lombardi et al. Removal of the erodable material after construction of the shoe press belt 40 (by, for example, dissolving the material in a suitable solvent) can create a gap between the shoe press belt 40 and the mandrel, thereby facilitating removal of the shoe press belt 40 therefrom. This method of forming a shoe press belt is described in co-pending and co-assigned U.S. Patent Application No. 60/367,340 entitled METHOD OF MANUFACTURING A PLAIN AND/OR GROOVED ENDLESS BELT FOR DEWATERING OF PAPER AND INDUSTRIAL SHEETS IN PRESSING OPERATIONS and filed concurrently (Attorney Docket No. 5690-3), the disclosure of which is hereby incorporated herein by reference in its entirety.

A shoe press belt 40 that includes a sensor assembly as described above can provide real-time information about operational parameters in the nip, such as the magnitude and distribution of pressure, nip width, strain, stress, and temperature. Such information can enable an operator to adjust the shoe press 20 as desired for the papermaking operation at hand. For example, it may be desirable to adjust the shoe 32 so that pressure within the nip 25 remains at a certain magnitude. As another example, it may be desirable to adjust the shoe 32 so that the peak pressure experienced in the nip 25 is located toward the "downstream" end of the nip 25 rather than in the center, as doing so can improve the quality of paper formed therein.

It is also contemplated that a belt of the present invention may be suitable for other uses. These may include, for example, calendering belts for papermaking machines.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A shoe press, comprising:
   a first member having a convex pressing surface;
   a second member comprising a shoe with a concave pressing surface substantially complimentary to said convex pressing surface, said second member further comprising a pair of substantially circular head plates rotatably mounted on axially opposed ends thereof;
   a substantially cylindrical belt fixed to, extending between, and rotatable with said head plates such that a portion of said belt passes between said convex pressing surface and said concave pressing surface, said belt including embedded therein a communications cable having a plurality of sensors configured to generate signals responsive to an operating parameter of said shoe press; and
   a processing unit in communication with said communications cable that processes signals generated by said sensors.

2. The shoe press defined in claim 1, wherein said first member comprises an elongate roll.

3. The shoe press defined in claim 1, wherein said second member includes a beam member extending axially within said belt, and said shoe is mounted on said beam member.

4. The shoe press defined in claim 3, further comprising a biasing unit that controllably biases said shoe against said belt.

5. The shoe press defined in claim 1, wherein said belt comprises an outer polymeric layer, an inner polymeric layer, and a fabric layer sandwiched between said outer polymeric layer and said inner polymeric layer.

6. The shoe press defined in claim 5, wherein said outer and inner polymeric layers comprise polyurethane.

7. The shoe press defined in claim 6, wherein said outer polymeric layer has an outer surface facing away from said fabric layer, said outer surface including water venting recesses therein.

8. The shoe press defined in claim 1, further comprising an endless press felt positioned to be conveyed between said belt and said pressing surface of said second member.

9. The shoe press defined in claim 1, wherein said communications cable is an optical fiber.

10. The shoe press defined in claim 1, wherein said fiber is disposed in said belt in a single helix.

11. The shoe press defined in claim 1, wherein said processing unit is mounted on one of said head plates and is connected with said communications cable.

12. The shoe press defined in claim 11, wherein said processing unit comprises a signal transmitter, and wherein said shoe press further comprises a signal receiver and a display device operatively associated with said signal transmitter.

13. The shoe press defined in claim 12, wherein said signal transmitter is configured to emit radio frequency signals corresponding to the operating parameter detected by said sensors, and said signal receiver is configured to receive radio frequency signals transmitted by said signal transmitter.

14. The shoe press defined in claim 1, wherein at least some of said plurality of sensors are configured to respond to one of pressure, strain, stress, and temperature experienced by the belt as it passes between said pressing surfaces of said first member and said shoe and generate signals corresponding to such pressure.

15. A belt for a shoe press, comprising:
    a substantially cylindrical inner polymeric layer having a first longitudinal axis and a radially inner surface;
    a substantially cylindrical outer polymeric layer having a second longitudinal axis that is substantially collinear with said first axis and a radially outer surface;
    said radially inner and said radially outer surfaces defining a belt thickness;
    a substantially cylindrical fabric layer sandwiched between said inner and outer polymeric layers; and
    a communications cable having a plurality of sensors configured to detect an operating parameter of an extended nip press, said communications cable fiber extending within said belt thickness.

16. The belt defined in claim 15, wherein said inner and outer polymeric layers comprise polyurethane.

17. The belt defined in claim 15, wherein said polyurethane has a Pusey and Jones hardness value of between about 4 and 120.

18. The belt defined in claim 15, wherein said outer surface includes a plurality of recesses for venting water.

19. The belt defined in claim 15, wherein said fabric layer comprises a woven fabric.

20. The belt defined in claim 15, wherein said fabric layer comprises a plurality of circumferentially-extending reinforcing members.

21. The belt defined in claim 15, wherein said communications cable overlies said fabric layer and is at least partially embedded in said outer polymeric layer.

22. The belt defined in claim 15, wherein said communications cable interweaves with said fabric layer.

23. The belt defined in claim 15, wherein said communications cable is disposed in a single helix within said belt.

24. The belt defined in claim 15, wherein said communications cable extends axially across said belt at a single circumferential location.

25. The belt defined in claim 15, wherein said communications cable extends circumferentially within said belt at a single axial location.

26. The belt defined in claim 15, wherein said communications cable is an optical fiber, and said sensors are microbend sensors.

27. The belt defined in claim 15, wherein said sensors are configured to respond to an operational parameters selected from the group consisting of pressure, area, strain, stress and temperature and to generate signals proportionate to such operational parameter.

28. The belt defined in claim 15, wherein said sensors are spaced substantially equidistant from each other along the length of said sensing fiber.

29. The belt defined in claim 15, wherein said outer surface defines a circumference of between about 40 and 80 inches, and said belt thickness is between about 0.080 and 0.400 inches.

30. The belt defined in claim 29, wherein said plurality of sensors is between about 10 and 40 sensors.

31. A belt for a shoe press, comprising:
- a substantially cylindrical polymeric layer having a first longitudinal axis, a radially inner surface, and a radially outer surface, said radially inner and said radially outer surfaces defining a belt thickness; and
- a communications cable having a plurality of sensors configured to detect an operating parameter of an extended nip press, said communications cable fiber extending within and embedded in said belt thickness.

32. The belt defined in claim 31, wherein said polymeric layer comprises polyurethane.

33. The belt defined in claim 31, wherein said polyurethane has a Pusey and Jones hardness value of between about 4 and 120.

34. The belt defined in claim 31, wherein said outer surface includes a plurality of recesses for venting water.

35. The belt defined in claim 31, further comprising a fabric layer located between the radially inner and radially outer surfaces, the fabric layer comprising a plurality of circuinferentially-extending reinforcing members.

36. The belt defined in claim 35, wherein said communications cable overlies said fabric layer.

37. The belt defined in claim 35, wherein said communications cable interweaves with said fabric layer.

38. The belt defined in claim 31, wherein said communications cable is disposed in a single helix within said belt.

39. The belt defined in claim 31, wherein said communications cable extends axially across said belt at a single circumferential location.

40. The belt defined in claim 31, wherein said communications cable extends circumferentially within said belt at a single axial location.

41. The belt defined in claim 31, wherein said communications cable is an optical fiber, and said sensors are microbend sensors.

42. The belt defined in claim 31, wherein said sensors are configured to respond to an operational parameters selected from the group consisting of pressure, area, strain, stress and temperature and to generate signals proportionate to such operational parameter.

43. The belt defined in claim 31, wherein said sensors are spaced substantially equidistant from each other along the length of said sensing fiber.

44. The belt defined in claim 31, wherein said outer surface defines a circumference of between about 40 and 80 inches, and said belt thickness is between about 0.080 and 0.400 inches.

45. The belt defined in claim 31, wherein said plurality of sensors is between about 10 and 40 sensors.

* * * * *